US010621629B2

(12) United States Patent
Bakun

(10) Patent No.: US 10,621,629 B2
(45) Date of Patent: Apr. 14, 2020

(54) EXERCISE MOTIVATING FITNESS TRACKER

(71) Applicant: PayPal, Inc., San Jose, CA (US)

(72) Inventor: Damon Bakun, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 568 days.

(21) Appl. No.: 14/967,110

(22) Filed: Dec. 11, 2015

(65) Prior Publication Data

US 2017/0165526 A1 Jun. 15, 2017

(51) Int. Cl.
G06Q 30/02 (2012.01)
G01S 19/19 (2010.01)

(52) U.S. Cl.
CPC .......... G06Q 30/0279 (2013.01); G01S 19/19 (2013.01)

(58) Field of Classification Search
None
See application file for complete search history.

(56) References Cited

U.S. PATENT DOCUMENTS

2012/0015778 A1* 1/2012 Lee ................... A63B 71/0622
482/8
2014/0067494 A1* 3/2014 Squires ............. G09B 19/0038
705/14.1

* cited by examiner

Primary Examiner — Bruk A Gebremichael
(74) Attorney, Agent, or Firm — Haynes and Boone, LLP

(57) ABSTRACT

A system and method for implementing and executing user configured incentives for exercise goals with data from biometric measuring devices. The system and method may include processes such as determining a user specified fitness goal, identifying fitness metrics associated with the goal, determining whether the user specified fitness goal was achieved based on measured fitness metrics, and implementing an incentive based on whether the fitness goal was achieved or not.

20 Claims, 7 Drawing Sheets

400

401
Receive Incentive Category

402
Receive Selection of Incentive Object

403
Receive Account Information To Associate With Reward/Penalty

404
Tie Incentives To Fitness Goals

EXERCISE MOTIVATING FITNESS TRACKER

TECHNICAL FIELD

The present disclosure generally relates to fitness trackers and more specifically, fitness trackers that provide customizable motivational tools.

BACKGROUND

Many devices have been developed to help individuals monitor and visualize their fitness levels and daily exercise routines. These devices, often referred to as fitness trackers, can monitor fitness-related metrics, such as number of steps taken, distance traveled, heartbeat, calories burned, time elapsed, and the like. Users who are most interested in these devices tend be active individuals and/or athletes that regularly participate in a sport of some sort, such as running, cycling, basketball, swimming, etc. Fitness trackers often help these types of individuals track their progress on certain fitness-related goals. For example, some users may use a fitness tracker to help prepare for a marathon run by monitoring their maximum running distance. In some examples, user may use the fitness tracker to help monitor their running pace or distance traveled in a race.

However, another group of users buy fitness trackers to help motivate them to maintain a balanced and healthy life. However, fitness trackers currently do not have many tools to motivate individuals into achieving certain fitness goals. There for it be beneficial if a system and method that could tie a user's fitness goals with some motivational element to increase the likelihood that a user achieves their fitness goals.

Figure 1:
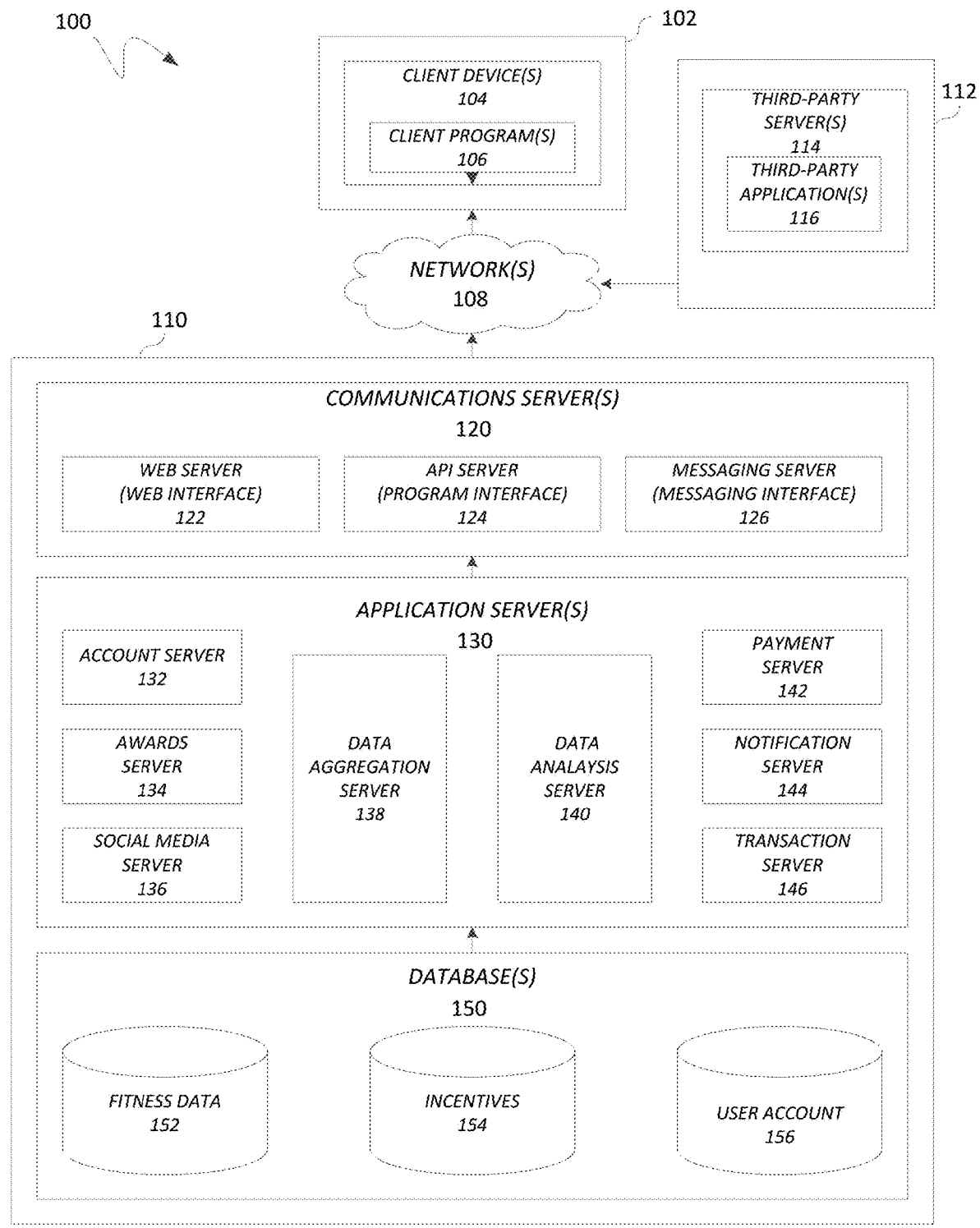
FIG. 1 is a block diagram of an exemplary computing system that is adapted for implementing a system for integrating user specified fitness goals with one or more fitness tracking devices.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

In some embodiments, a system and method for implementing a user specified incentives program that integrates with one or more fitness tracking devices is disclosed. A user of the system may be provided with a graphical user interface which allows the user to enter in fitness related goals. Some exemplary goals may include, but are not limited to, running a certain distance, running a certain distance under a certain amount of time, reducing blood pressure, reducing a resting heart rate, maintaining an exercise routine, or beating a previous personal best/max measurement of a fitness related metric (e.g. running a mile faster, swimming 100 meters faster, etc.). The system may provide the user with the ability to attach an incentive to the fitness related goal. For example, the user may use a reward and/or penalty system to help incentivize the user to achieve the fitness goal. Exemplary rewards may include, but are not limited to, increasing the spending limits on a payment account or providing access time to a device or an account (such as a television or media streaming website). Exemplary penalties may include, but are not limited to, causing the user to donate money to a charity, reducing spending limits on a payment account, causing money to be placed into a retirement account, and/or the like.

The system may provide a GUI interface for the user to input account information to associate with an incentive, such as a payment account, credit card information, and/or the like. The system may also allow for the user to attach third-party accounts to incentives. For example, the user may be interested in raising funds for a charity, such as doing a charity run, and request donors to register with the system and donate money when the user achieves a certain milestone, goal, or metric. For example, third-party accounts may pledge to donate money for every mile ran, meter swam, and/or the like. In some examples, the system may provide the user with a uniform resource locator (URL) link that allows for third-party donors to make pledges to the fitness goals set up by the user.

In some examples, the system may provide an interface for the user to register and/or connect one or more fitness devices to the system such that the system may monitor the user's progress in completing one or more fitness goals. In some examples, the system may analyze the data received from the one or more fitness devices to identify the activity that the user is conducting. For example the system may determine whether the user is running or walking through a combination of an accelerometer detecting steps and global positioning system (GPS) positional updates indicating speed of movement.

The system may monitor and update the progress of a fitness goal based on the registered and/or connected fitness devices and execute rewards and/or penalties based on the progress. The system may display real-time results to others monitoring the user, such as donors to the user participating in the event. Donors may thus be able to see how the user is doing in the event (such as a race), including how the user is performing, how much funds have been raised, how the performance and/or funds compare with others participating in the event, adjusting donation amounts or conditions for donation during the event, and notifying the user during the event, including notifications related to changed donation amounts or conditions.

FIG. 1 illustrates, in block diagram format, an exemplary embodiment of a computing system that may be adapted to implement one or more of the processes for exercise motivation using a fitness tracker discussed herein. As shown, a computing system 100 may comprise or implement a plurality of servers and/or software components that operate to perform various methodologies in accordance with the described embodiments. Exemplary servers may include, for example, stand-alone and enterprise-class servers operating a server operating system (OS) such as a MICROSOFT® OS, a UNIX® OS, a LINUX® OS, or other suitable server-based OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements, one or more clients 102 that may comprise or employ one or more client devices 104, such as a laptop, a mobile computing device, a tablet, a PC, a wearable device, and/or any other computing device having computing and/or communications capabilities in accordance with the described embodiments. Client devices 104 may include a cellular telephone, smart phone, or other similar mobile devices that a user may carry on or about his or her person and access readily.

Client devices 104 generally may provide one or more client programs 106, such as system programs and application programs to perform various computing and/or communications operations. Exemplary system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a web browser application, messaging applications (e.g., e-mail, IM, SMS, MMS, telephone, voicemail, VoIP, video messaging, internet relay chat (IRC)), contacts application, calendar application, electronic document application, database application, media application (e.g., music, video, television), location-based services (LBS) applications (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 104. In some embodiments, client programs 106 may include one or more applications configured to conduct some or all of the functionalities and/or processes discussed below.

As shown, client devices 104 may be communicatively coupled via one or more networks 108 to a network-based system 110. Network-based system 110 may be structured, arranged, and/or configured to allow client 102 to establish one or more communications sessions between network-based system 110 and various computing devices 104 and/or client programs 106. Accordingly, a communications session between client devices 104 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data communications between client devices 104 and the network-based system 110 may be sent and received over one or more networks 108 such as the Internet, a WAN, a WWAN, a WLAN, a mobile telephone network, a landline telephone network, as well as other suitable networks. For example, client devices 104 may communicate with network-based system 110 over the Internet or other suitable WAN by sending and or receiving information via interaction with a web site, e-mail, IM session, and/or video messaging session. Any of a wide variety of suitable communication types between client devices 104 and system 110 may take place, as will be readily appreciated. In particular, wireless communications of any suitable form may take place between client device 104 and system 110, such as that which often occurs in the case of mobile phones or other personal and/or mobile devices.

In various embodiments, computing system 100 may include, among other elements, a third party 112, which may comprise or employ third-party servers 114 hosting a third-party applications 116 and third-party devices 118. In various implementations, third-party servers 114 and/or third-party applications 116 may host applications associated with or employed by a third party 112. For example, third-party servers 114 and/or third-party applications 116 may enable network-based system 110 to provide client 102 with additional services and/or information, such as message logging, message transferring, command recognition, security functions, mapping services, payment services, and/or other services, some of which will be discussed in greater detail below. Third-party servers 114 and/or third-party applications 116 may also provide system 110 and/or client 102 with other information and/or services, such as email services and/or information, social networking services and/or information, property transfer and/or handling, purchase services and/or information, and/or other online services and/or information.

In one embodiment, third-party servers 114 may include a social networking server that hosts a user's social network account. In another embodiment, third party-servers 114 may include an email server that hosts a user's email account. In yet another embodiment, third-party severs 114 may include one or more servers for aggregating user data and statistics.

Network-based system 110 may comprise one or more communications servers 120 to provide suitable interfaces that enable communication using various modes of communication and/or via one or more networks 108. Communications servers 120 may include a web server 122, an API server 124, and/or a messaging server 126 to provide interfaces to one or more application servers 130. Application servers 130 of network-based system 110 may be structured, arranged, and/or configured to provide various online services, account authentication, social networking, account management, property transfers, data analysis, data tracking, data visualization, and other services to users that access network-based system 110. In various embodiments, client 102 may communicate with applications servers 130 of network-based system 110 using one or more client devices 104 via one or more of a web interface provided by web server 122, a programmatic interface provided by API server 124, and/or a messaging interface provided by messaging server 126. It may be appreciated that web server 122, API server 124, and messaging server 126 may be structured, arranged, and/or configured to communicate with various types of client devices 104, third-party servers 114, third-party applications 116, and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, and so forth. API server 124 may be arranged to communicate with various client programs 106 and/or a third-party application 116 comprising an implementation of API for network-based system 110. Messaging server 126 may be arranged to communicate with various messaging clients and/or applications such as e-mail, IM, SMS, MMS, telephone, VoIP, video messaging, IRC, and so forth, and messaging server 126 may provide a messaging interface to enable access by client 102 and/or third party 112 to the various services and functions provided by application servers 130.

Application servers 130 of network-based system 110 may be a server that provides property transfer, notification, fitness device data tracking, fitness data visualization, fitness data aggregation, and social connection services. Application server 130 of network-based system 110 may provide services such as, account services, authentication services, content management services, payment services, user data gathering services, notification services, fund transfer, funds and/or currency exchanges, and/or other services. Application servers 130 may include an account server 132, a data aggregation server 138, a data analysis server 140, a payment server 142, a notification server 144, and/or a transaction server 146. Application servers 130 may further include an awards server 134 for managing incentives discussed in more detail below, a social media server 136, and/or a delivery server 146. These servers, which may be in addition to other servers, may be structured and arranged to aid in creating fitness goal based incentives, receiving and managing data from fitness tracking devices, managing incentives, displaying progress of fitness goals, in addition to some or all of the other services as discussed above and in more detail below.

Application servers 130, in turn, may be coupled to and capable of accessing one or more databases 150 including a fitness data database 152, a incentives database 154, and/or user account database 156. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
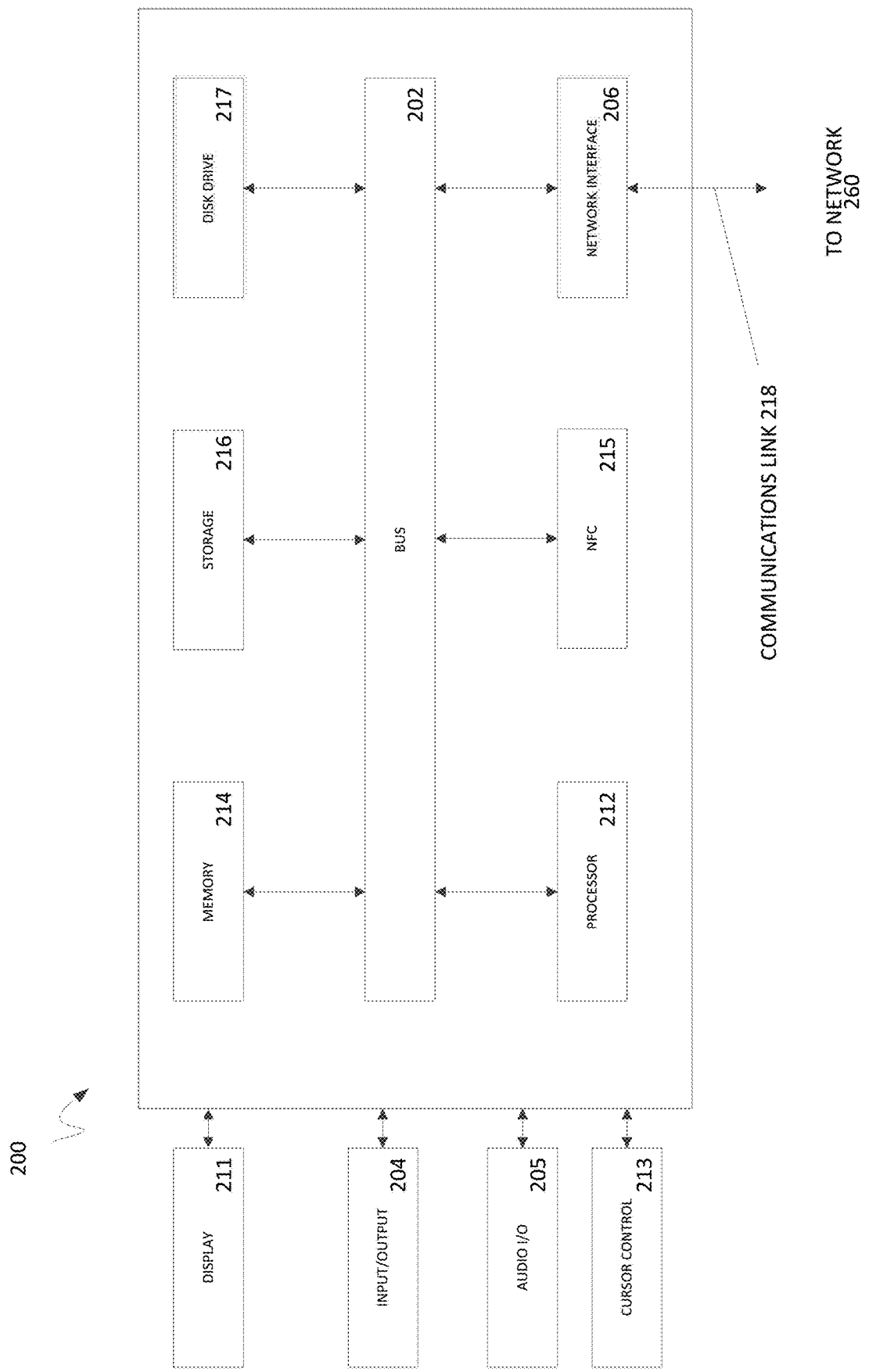
FIG. 2 is a block diagram of an exemplary computer system suitable for implementing one or more devices of the computing system in FIG. 1.

FIG. 2 illustrates an exemplary computer system 200 in block diagram format suitable for implementing on one or more devices of the computing system in FIG. 1. In various implementations, a device that includes computer system 200 may comprise a personal computing device (e.g., a smart or mobile phone, a computing tablet, a personal computer, laptop, wearable device, PDA, Bluetooth device, key FOB, badge, etc.) that is capable of communicating with a network. A service provider and/or a payment provider may utilize a network computing device (e.g., a network server) capable of communicating with the network. It should be appreciated that each of the devices utilized by users, service providers, and payment providers may be implemented as computer system 200 in a manner as follows.

Additionally, as more and more devices become communication capable, such as sensors using wireless communication to report, track, message, relay information and so forth, these devices may be part of such systems.

Computer system 200 may include a bus 202 or other communication mechanisms for communicating information data, signals, and information between various components of computer system 200. Components include an input/output (I/O) component 204 that processes a user action, such as selecting keys from a keypad/keyboard, selecting one or more buttons, links, actuatable elements, etc., and sends a corresponding signal to bus 202. I/O component 204 may also include an output component, such as a display 211 and a cursor control 213 (such as a keyboard, keypad, mouse, touch screen, etc.). An optional audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as another user device, a merchant server, an email server, application service provider, web server, a social networking server, a payment provider server, and/or other servers via a network. In various embodiments, such as for many cellular telephone and other mobile device embodiments, this transmission may be wireless, although other transmission mediums and methods may also be suitable. A processor 212, which may be a micro-controller, digital signal processor (DSP), or other processing component, processes these various signals, such as for display on computer system 200 or transmission to other devices over a network 260 via a communication link 218. Again, communication link 218 may be a wireless communication in some embodiments. Processor 212 may also control transmission of information, such as cookies, IP addresses, and/or the like to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and/or transmission media. In various implementations, non-volatile media includes optical or magnetic disks, volatile media includes dynamic memory, such as system memory component 214, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In some embodiments, computer system 200 may include a near field communication (NFC) device 215. NFC device 215, in various embodiments may be positioned as such that it is capable of exchanging data with other devices with NFC technology when placed adjacent to and/or in close proximity to NFC device 215 (this is sometimes referred to as a "tap").

NFC devices 215, in various embodiments, include an NFC transceiver circuitry and/or an NFC antenna. NFC devices may communicate using magnetic fields or electric fields, and may implement standards such as ECMA-340 (NFCIP-1), ECMA-352 (NFCIP-2), ISO/IEC 18092, ISO/IEC 21481, ISO/IEC 14443A, ISO/IEC 14443B, ISO/IEC 15693, JIS X6319-4, and FeliCa. However, it is contemplated that other short-range wireless communication technologies and standards (e.g., radio-frequency identification (RFID), Bluetooth or Bluetooth low energy (BLE), etc.) may be utilized in place of NFC device 215 and fall within the scope of the present disclosure. One of ordinary skill in the art will recognize that the use of near field communication with NFC device 215 may be advantageously utilized to provide for low power communication, and also provide a more secure communication due to its short range.

NFC device 215, in various embodiments, may be configured to detect other devices with NFC technology adjacent to computer system 200, such as when other devices are within the range of NFC device 215 (e.g., within 2 cm, within 5 cm, within 10 cm, within 20 cm, etc.). NFC device 215 may create a communication area for detecting other devices with NFC capabilities. When other devices with NFC capabilities are placed in the communication area of NFC device 215, NFC device 215 may detect the other devices and exchange data with the other devices.

NFC device 215 may receive identifier data packets from the other devices when in sufficiently close proximity. The identifier data packets may include one or more user identifiers, which may be operating system registry entries, cookies associated with a user interface application, identifiers associated with hardware of the other device, or various other appropriate identifiers. The user identifiers may be used to identify the other device, the user of the other device, or a user account associated with the other device, and/or the user itself. NFC device 215 may further exchange data and information with the other device.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Figure 3:
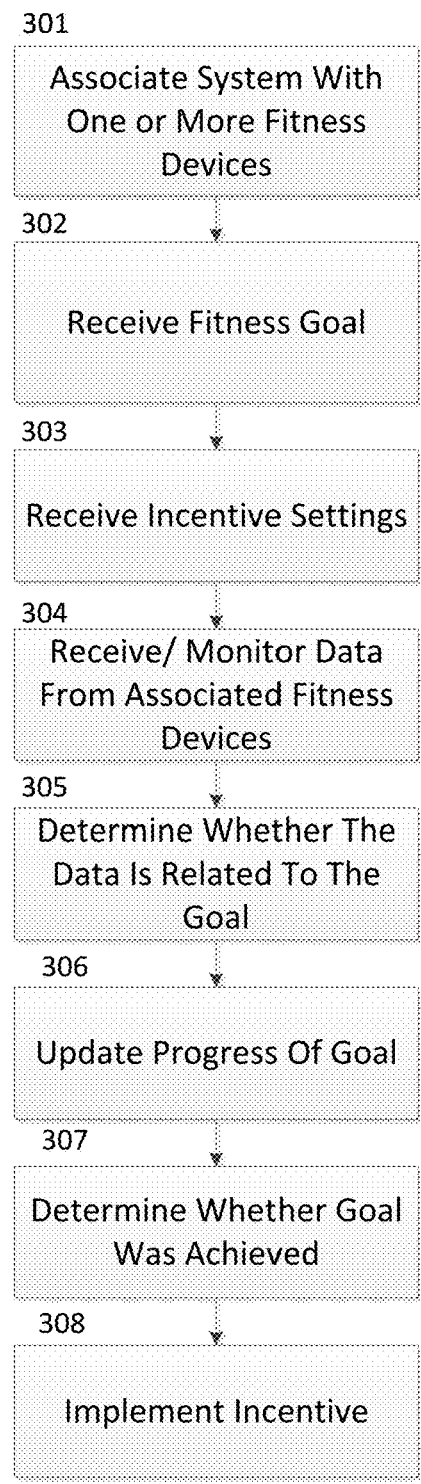
FIG. 3 is a flow diagram illustrating exemplary processes for implementing a fitness goal motivator that integrates data from one or more fitness tracking devices.

FIG. 3 is a flow diagram illustrating exemplary processes 300 of a fitness goal motivator integrating data from one or more fitness tracking devices. Processes 300 may be implemented on a system such as system 100 of FIG. 1 according to some embodiments. According to some embodiments, processes 300 may include one or more of processes 301-308 which may be implemented, at least in part, in the form of executable code stored on a non-transitory, tangible, machine readable media that, when run on one or more processors, may cause the one or more processors to perform one or more of the processes 301-308.

At process 301, the system may be associated with one or more fitness type devices. In some examples, the system may provide, on a graphical user interface (GUI), one or more options of fitness tracking devices to integrate with the system. Some exemplary fitness tracking devices may include, but are not limited to, smart watches, smart phones, pedometers, fitness bands, heart rate monitors, smart clothes, heart rate monitors, electronic scales, and/or the like. These devices may contain applications and hardware to monitor and collect data for extrapolating use activity including, but are not limited to, biometric monitoring and location monitoring, and/or the like. Such data may be collected by one or more of devices through a combination of one or more heartbeat monitors, electromyography (EMG) monitors, brainwave scanners, heat scanners, bioelectrical impedance (BIA) monitors, motion detection using accelerometers and/or gyroscopes, pedometers, location tracker (e.g. GPS), and/or the like.

Different fitness tracking devices will often use different software, application program interfaces (API), and data formats. Furthermore, the type of data held on the fitness tracking devices may differ, such as accelerometer readings in one device and EMG readings in another device. Therefore, identifying the particular tracking device may help enable the system to determine which API calls to use, and how to parse the data collected by the fitness tracking devices for relevant information to implement one or more processes in processes 300.

In some embodiments, the system may be able to associate one or more fitness tracking devices through a wired or wireless synchronization with the system. For example, a fitness tracking device may have Bluetooth® capabilities that enable the devices to wireless communicate with the system through Bluetooth®. The fitness tracking device, as part of the synchronization or syncing process, may identify itself by providing a model number, device type, serial number, and/or the like. The system may register and recognized devices with an account and set up a database for collecting and logging information from the associated devices.

In some embodiments, the system may associate with one or more fitness tracking devices through one or more fitness tracking programs that the fitness tracking device syncs with for providing, storing, and parsing data. For example, some fitness tracking devices sync with an application that may extract and/or receive recorded sensor data from the fitness tracker as part of the syncing process. This data may be held in a database that the application creates, maintains, updates, and/or manages. The system may communicate and connect with the application through one or more APIs to extract the data for use in one or more processes of processes 300.

At process 302, the system may receive a user provided fitness goal or fitness metric achievement through a client device. Some exemplary fitness goals may include, but are not limited to, lose a user specified weight, run a user specified distance, run for a user specified amount of time, run at a user determined pace, climb a user determined number of steps and/or elevation, complete a trail within a user provided time, swim a user provided distance or number of strokes, bicycle a user defined distance, burn a user determined number of calories, and/or the like.

In some examples, the goal or metric achievement may include a time limit and/or other time elements. An exemplary fitness metric achievement and/or goal may be to burn 500 calories every day. Other examples may include, but are not limited to, losing 20 lbs in a month, running three miles by the end of a month, running a mile under 8 minutes by the end of a month, and/or the like. Thus the time elements may represent a deadline to achieve a fitness goal or to help establish a routine of achieving smaller regular fitness goals. In some examples, the goal may include milestones which may be smaller or sub fitness goals that are part of a larger goal. For example, increasing a running distance by 20% each week may be a sub-goal for a goal to achieve a user provided running distance by the end of a month.

The data provided in a goal may include one or more of the following: one or more fitness metrics that one or more of the associated fitness tracking devices are capable of sensing, tracking, and/or otherwise determining (e.g., calories burned, weight loss/gain, distance traveled, steps taken, and/or the like); an expiration time; a repeat setting, and/or the like. An exemplary data format may be an array such as the following:

| Goal | Expi-ration | First Mile-stone | Expi-ration | Second Mile-stone | Expi-ration | Category | Pace |
|---|---|---|---|---|---|---|---|
| 60 miles | Jan. 1, 2016 | 30 miles | Dec. 16, 2015 | 2 miles | 5 pm Daily | Running | 10 min/mile |

In this example, the goal would be to run 60 miles by Jan. 1, 2016, with a first milestone of running 30 miles by Dec. 16, 2015 and a second milestone of running 2 miles every day by 5 pm. The run has a pace set of 10 minutes per mile. In other examples, there may be more or less milestones. In some examples, there may be a different entry for the fitness category, such as swimming, rowing or other categories. Additionally, in some examples, the data may specify more or less constraints and/or instructions. For example, the data may not include a pace.

In some examples, as discussed in more detail below, the system may provide a user interface for a user to trace a travel route for a fitness goal. The system may provide a GUI of a map wherein the user may be able to delineate a travel route with a start and a finish point, wherein traveling from the start point to the finish point may be at least part of a goal. The user may also be able to put markers on the travel route indicating milestones without the goal. In some examples, the system may provide the GUI through a third party-mapping system that may be provided by a third-party provider, such as a provider of a web mapping service.

At process 303, the system may receive one or more incentive settings for motivating a user to maintain goals and/or milestones. In some examples, the settings may be monetary in nature. In some examples, the settings may execute a penalty for when a goal and/or a milestone is not reached. In some examples, the settings may execute a reward for when a goal or milestone is successfully completed. In some examples, the incentive settings may use a combination of penalties and rewards. An exemplary penalty and reward system is discussed in more detail below.

At process 304, the system may monitor and/or receive data from the one or more associated fitness devices. The data may comprise one or more fitness metrics, such as number of steps taken, heart rate, calories burned, distance traveled, GPS coordinate of the traveled area, and/or the like. In some examples, the data may be received regularly from one or more fitness devices in cases where the fitness device is capable of constantly communicating with the system. For example, the fitness device may be part of a communication network that includes the system, such as the internet. Some exemplary devices that may be capable of continuously updating the system may include, but are not limited to, smart phones and smart watches. Additionally, as more and more devices are capable of connecting to an internet network, those devices may also continuously update the system with measured fitness metrics. In some examples, the fitness metrics may be received when the fitness device syncs with the system and/or syncs with another client device that is in communication with the system and may relay the information from the fitness device to the system.

At process 305, the system may determine whether the data received/monitored at process 304 constitutes progress to the fitness goal. In some examples, the system may check to see if the data from the fitness devices is congruent with the fitness category of the fitness goal. For example, if the category was running, the system may check whether the received fitness data, alone or in combination, indicates that a run occurred. The system may receive pedometer data indicating that steps occurred at a certain time, GPS data indicating a travel speed congruent with running. Other fitness data that may be used to indicate running may include heart rate, perspiration, muscle activity, and/or the like. Based on this data, the system may determine that the user was running. In some examples, the system may be configured to determine running using different combinations of data, and if the combination of data is not received, the system may presume that a run did not occur. For example, pedometer readings in addition to one other measurement may indicate running. In some examples, instead of pedometer readings, there may be gyroscope and/or accelerometer readings received to indicate that the user was on foot rather than on a moving vehicle.

Different combinations of fitness data may be used by the system to confirm progress on a fitness goal. For example, the system may search for pressure sensor readings and/or patterns indicative of swim strokes for a swimming category; bicycling speeds from movement data, such as GPS, for a bicycling category; changes in elevation for a stairs category; and/or the like.

In some examples, the data may be received by a plurality of devices and combined by the system. For example, the system may receive pedometer readings from a pedometer, GPS readings from a smart phone, and muscle activity from smart clothing. The data received may each include a time stamp such that the system may synchronize the data from each device with the other devices and analyze the combined data as a whole for whether the data is indicative of progress on a goal. In this manner the system may differentiate a car ride from a run or differentiate fitness activities from each other or from non-fitness activities. The system may combine different data readings from one or more fitness tracking devices to prevent recording false positives for progress on a fitness goal.

At process 306, the system may update the progress of the goal based on the data analyzed at process 305. For example, the system may increment the distance ran, swam, cycled, rowed, and/or the like depending on the fitness related metric data received, the fitness metric data extrapolated from the data receive, and/or the categorization of the data received.

In some examples, the system may provide a display of the progress to one or more client devices. In some examples, the display may be provided in response to a request. In some examples, the system may cause the client device to display the progress. In some examples, the display of progress may be in the form of a progress bar, a percent completion, and/or a map of the current progress of a trail. In some examples, the progress bar may also display indications of sub-goals that have been achieved and/or milestone achievements.

The system may update user devices with real-time progress of a user to a fitness goal for viewers to monitor. In some examples, the system may also display other information, such as the amount of donations received, the amount of potential donations that are available, the amount of donations associated with one or more fitness goals and/or sub-goals, and/or the like.

In some examples, the system may provide an interface that allows users to change donations and/or pledges along with viewing the goal progress. In some examples, a user may be able to attach more donations to a sub-goal or goal based on the performance or progress of the user performing the fitness goal. For example, a user may notice that a user is behind on a sub-goal and may increase the donation for that sub-goal to increase the incentive of achieving that sub-goal. In some examples, a user may be able to relax the condition of a donation. For example a user may have intended to donate regardless of a fitness goal, but based on the progress of the goal, the goal may seem unachievable. In response, the user could relax the condition of the donation by changing the goal metric and/or switching the donation trigger to another goal or sub-goal.

In some examples, a view may be able to add new sub-goals and/or goals to a user's fitness goal along with an incentive to achieve the sub-goal and/or goal. The user performing the sub-goal and/or goal may be updated with the new goal such that the user can decide whether the incentive is worth completing the new sub-goal and/or goal. For example, a user may add a goal to run an additional mile with a monetary incentive to achieve this goal.

At process 307, the system may determine whether a goal was achieved. In some examples, this determination may be made at an expiration time, which may be recurring or repeating at regular intervals. For example, the system may determine whether a goal to run five miles by a certain day and time is met by determining whether the fitness data received at process 304 and/or the goal progress at 306 indicates that 5 miles has been run. In some examples, a comparison of the summation of data readings in relation to that goal, such as distance traveled while running may be compared with the goal. When the data readings indicate that the fitness metrics are equal to or above the user specified goal, the system may determine that the goal was reached. When the data readings are below the specified goal and after an expiration time, the system may determine that the goal/milestone was not achieved.

At process 308, the system may implement and/or execute the incentive settings at process 303 based on whether the goals and/or milestones were successfully completed. For example, a monetary transfer may occur based on whether the goals and/or milestones were successfully completed. In some examples, the failure to complete a milestone may be reversed when the next milestone and/or overall goal is successfully completed. For example, the system may escrow money for transfer when a milestone is unsuccessfully completed, which will be transferred if the overall goal is not successfully completed, but if the next milestone and/or overall goal are successfully completed, some of the escrowed money may be returned. In some examples, the system may apply penalties at the expiration of a goal, such that a similar effect can be implemented without an escrow. In effect, the penalty of a previous milestone may be reversed by getting back on track of a goal or successfully completing a goal.

In some examples, the amount of progress a user obtained towards a goal may reduce the penalty. For example, if the penalty was to donate 100 dollars to a charity for failing to achieve a goal, but the user progressed through 90% of the goal (such as having run 90 of 100 miles), only 10% of the penalty may be implemented by donating 10 dollars rather than 100 dollars. In this manner, even if the user falls behind so much that the goal is unachievable, the user will continue to have motivation to achieve as much of the goal as possible. In some examples, the penalty may have a minimum penalty that is implemented regardless of how much progress a user makes on the goal, but still fails. For example, the penalty may be to donate 100 dollars for failure and up to another additional 100 dollars that depends on the percent completion of the goal below 100%.

Figure 4:
FIG. 4 is a flow diagram illustrating exemplary processes for implementing user specified incentive settings.

FIG. 4 is a flow diagram illustrating exemplary processes 400 for implementing incentive settings, such as process 303 of FIG. 3, according to some embodiments. Processes 400 may be implemented on a system such as system 100 of FIG. 1 according to some embodiments. According to some embodiments, processes 400 may include one or more of processes 401-404 which may be implemented, at least in part, in the form of executable code stored on a non-transitory, tangible, machine readable media that, when run on one or more processors, may cause the one or more processors to perform one or more of the processes 401-404.

At process 401, the system may receive a categorization of an incentive such as penalty and/or reward. In some examples, the system may provide a GUI interface wherein the user may select the category through a button, checkbox, and/or drop down menu.

At process 402, the system may receive a user selected incentive object. For example, the system may provide different penalties and/or reward options for the user to select and implement as part of the incentive. For example, the reward and/or penalty may be monetary in nature. For example, a user may be able to set up pledges for donations based on goal and/or milestone achievements. The user may cause pledgers to donate money based on a goal or milestone being achieved. In some examples, the incentive may be in the form of a penalty, wherein the user pledges to donate money when the user fails to achieve a goal and/or milestone. In this manner, the system uses imminent consequences as a motivator for the user to maintain their fitness goals. At the same time, the penalty may also have a positive impact by donating to charities.

However, a user may find donating money too wasteful and punitive, and may instead have the system unlock or reduce discretionary spending. For example, the system may control the spending limits for a payment application, account, device, and/or the like based on whether the user achieves or fails to achieve one or more milestones and/or goals. The user may have a payment instrument that is used for discretionary spending, and the system may increase the spending limit of the payment instrument based on goals and or milestones that the user successfully achieves. In some examples, the system may reduce the spending limit of the payment instrument for when a user fails to achieve a goal and/or milestone.

For example, the user may have an account with a payment provider such as PayPal®, and the payment account may be set up to allow for a maximum spending limit of $300 for a given period of time. The system may initiate the spending limit at $0 and increase the spending limit every time the user accomplishes a milestone or fitness goal. In some examples, the system may increase the spending limit based on the percentage of a goal that is completed. For example, a goal may be to run 100 miles, and the system may have determined that the user has run 50 miles, which is 50% of the goal. In response, the system may increase the spending limit by the corresponding percentage (50%), which in this case would be to $150. In some examples, the configuration of the incentive and how it is applied by the system may be configured by the user based on a plurality of GUI options provided by the system. In other examples, the spending limit may be increased in a non-linear manner, such as increasing the spending limit more rapidly toward the end of the goal. This takes into account that the beginning part of the goal may be the easiest and the last part may be the hardest, but most valuable or important for the user to achieve.

In some embodiments, the system may link with other systems and/or devices to implement different types of rewards. For example, a reward or penalty may be associated with access time to an account for a website, such as a media content website. A reward may unlock a device for a certain amount of time, or add usage time for a device. For example, the reward may be a couple hours of television. In another example, the incentive may be in the form of a penalty, such as reducing the amount of access time to an account or device.

At process 403, the system may receive account information to associate with the penalties and/or rewards selected at process 402. In some examples, the system may provide in a GUI selection of account types that are compatible with the system. In some examples, the account types may be for third-party applications that the system may connect and interact with through APIs. In some examples, such as for when penalties and/or rewards are monetary in nature, the system may request from the user account number for a credit card, debit card, or other payment instrument. In some examples, the system may request and receive from the user authentication information for certain payment instruments, such as web based payment providers.

In some examples, the user may be interested in associating accounts for other individuals and/or entities as part of the incentive. For example, the user may be interested in having money donated to a charity. In such an example, the user may enter in account information for fund raising, donating to the charity or another entity, and/or the like. In some examples, the user may be interested in obtaining pledgers. In some examples, such as in cases where the user is interested in receiving pledgers, the system may create a uniform resource locator (URL) that may be sent to individuals to login. The URL may link to a webpage or application for the recipient to provide account information for making pledges and choosing where the pledge money is donated. In this manner, the pledgers may have control over their pledges and can link accounts for pledging without directly providing account information to the user requesting the pledge.

In some examples, the pledgers may pledge money for when the user completes a goal and/or milestone. In some examples, the pledges may be penalty based wherein the pledger pledge money for when a user fails to complete a goal and/or milestone. In the latter example, the penalty may be used such that a friend and/or family may have a stake in the user's progress on a goal and/or milestone. The penalty may be an incentive to pressure and/or motivate the user into completing a goal and/or milestone. Another scenario may be to use the system as part of a penalty/reward for a fitness trainer. For example, the fitness trainer may promise a user that they would be able to get the user to a certain fitness level within a specified amount of time. For example, lose/gain a specified amount of weight. The system may tie the fitness goal and/or milestone to a bonus to be paid to the fitness trainer at the end, and each missed milestone and/or goal may penalize the fitness trainer. In this manner, the fitness trainer has an incentive to suggest realistic goals and be motivated to ensure the user obtains those goals.

At process 404, the system may tie the incentive settings to fitness goals that the user has created and/or provided, such as the goal set at process 302 of FIG. 3. In some examples, as discussed above and in more detail below, the user and/or pledgers may control how much of the incentive is applied to a particular goal and/or milestone.

Figure 5:
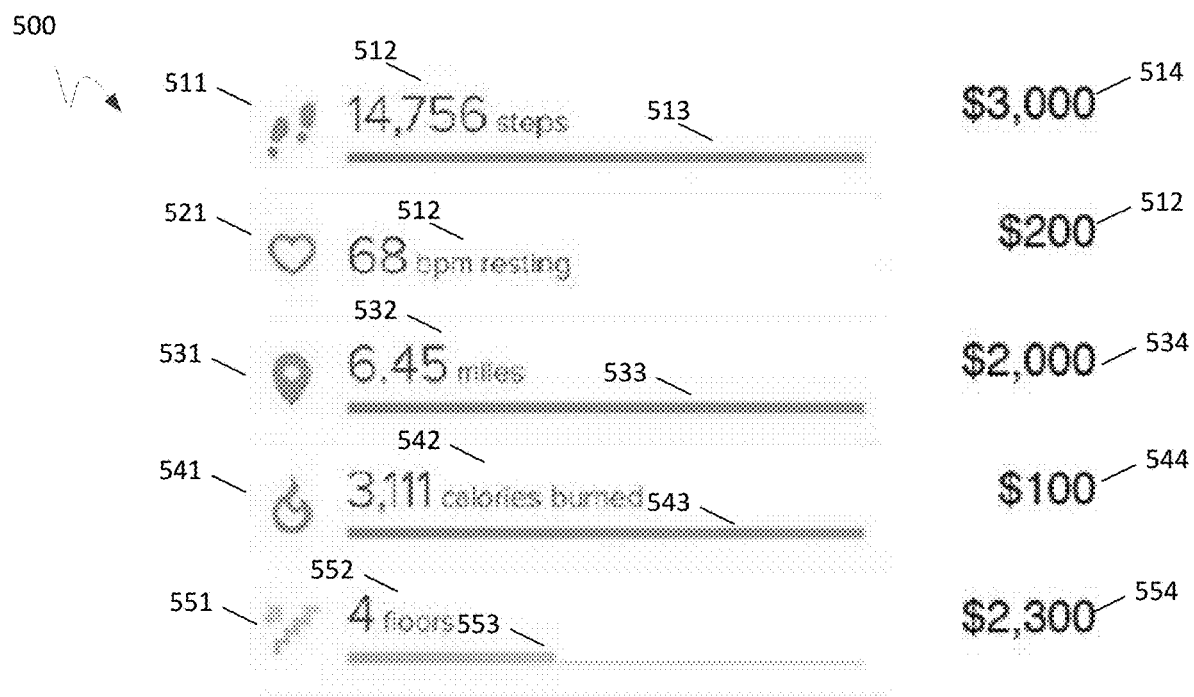
FIG. 5 illustrates an exemplary GUI interface for displaying progress of fitness goals.

FIG. 5 illustrates an exemplary GUI interface 500 for displaying progress of fitness goals. In some embodiments, the GUI may have icons associated with different fitness goals. For example, an icon 511 may show an image of footsteps for indicating that the fitness goal is associated with steps taken. Interface 500 may also display a progress indicator 512 and a status bar 513 for visualizing how much of the fitness goal is achieved. In this example, progress indicator 512 displays the number of steps taken and status bar 513 indicates that the goal is complete. Additionally, interface 500 may display an incentive 514 associated with the goal. In this example, incentive 514 is $3,000, which may be an amount raised as part of a fund raiser.

GUI interface 500 may also display additional goals, which may have different icons, progress indicators and/or incentives. For example, GUI interface 500 may include an icon 521 that is in the shape of a heart to indicate that the fitness goal is related to a heart rate. In this example, a fitness goal 522 is to achieve a 68 beat per minute resting heart rate. Lower resting heart rates may indicate a more efficient cardiovascular system, which may be trained. In this example, there are not any intermediate steps to achieving this goal, and therefore the progress bar may have a binary state of achieved or not achieved. When the resting heart rate goal is achieved, the system may award a user incentive 523 of $200. In some examples, the transfer of funds may be processed through a payment provider. In some examples, the payment information may be requested for each individual involved and an authorization to execute a funds transfer with the associated payment provider. In some embodiments, the payment providers may be associated with an escrow account such that the availability of pledge amounts and/or other funds can be ensured while a fitness goal is being completed. The escrow would allow for remuneration and/or refund based on the results of fitness goal achievements.

In some examples, GUI 500 may also display an icon 531 indicating a travel distance goal. In some embodiments, this goal may be for a user to have cycled or run a certain distance. GUI 500 may also display a current distance traveled 532, a progress bar 533 indicating how much of the goal has been accomplished, and the incentive 534 associated with achieving the goal. Similarly, there may be a goal icon 541 for calories burned and, an associated indicator of the number of calories burned 542, a progress bar 543 on achieving the calorie burning fitness goal, and an incentive 544 for the calorie burning fitness goal.

In some examples, GUI 500 may have a goal icon 551 indicating a goal related to number of floors climbed. The GUI may display an indicator 552 and a progress bar 553 to inform the user on how much of the goal has been achieved. In this example, this goal is still in progress as shown by progress bar 553. In some examples, the color of the progress bar may change depending on how much progress has been achieved, for example the progress bar may go from red to green, green indicating that a goal is close to being accomplished and/or has been accomplished. Additionally, as shown, GUI 500 may display an incentive 554 for completing the floor climbing goal.

Figure 6:
FIG. 6 illustrates an exemplary GUI map for a user to input a fitness goal and/or track the progress of a fitness goal.

FIG. 6 illustrates an exemplary GUI map 600 that a system may provide for a user to input a fitness goal and/or track progress of a fitness goal. In some embodiments, GUI map 600 may be implemented as part of one or more processes in FIGS. 3 and 4.

In some examples, GUI map 600 may be provided by the system through a third-party service provider. For example, the system may integrate with a third-party mapping service through APIs and implement one or more features on top of the third-party mapping service.

In some examples, GUI map 600 may display a location entry field 610 for the user to specify a location for the fitness goal. In response to receiving a location entry, the system may cause the GUI map 600 to display a map of the user entered location. GUI map 600 may provide the user the ability to drag and trace a travel route, such as a travel route 620 for setting up a fitness goal.

GUI map 600 may also provide the user the ability to place milestones for the fitness goal, such as milestones 631-633. These milestone markers may interface with the system such that a user may attach one or more incentives to the milestones. GUI map 600 may include a different marker 640 marking the end of the goal. In some examples, marker 640 may display an animation, discussed in more detail below, when the user successfully completes the goal.

In some examples, the system may allow for a less functional version of GUI map 600 to be shared such that the user's progress on a goal may be monitored. In some examples, path 620 may change colors as the user moves along the path towards the goal. In some examples, a marker (not shown) indicating the location of the user on the path may also be displayed. In this manner, the user's progress may be monitored in real time.

In some examples, when the GUI map 600 is shared with other users, the other users may be able to select one or more of the milestones and/or goal to add an incentive for the user to achieve the goal. For example, the other users may be able to click on milestone 631, and in response the system may display a popup that includes an option to add an incentive for the milestone. In some examples, the incentive may be a monetary donation. In such an example, the system may request a pledge amount and account information (e.g. credit card number, username and password, payment processor, and/or the like) for associating with the milestone. Once complete, the system may execute the pledge when the user completes the milestone. In some examples, the system may notify the user attempting the milestone of the new pledge through short messaging service, email, and/or other messaging services. In some examples, GUI map 600 may display the pledge, which may display and advertise the pledger's name and the amount pledged to other viewers.

Figure 7:
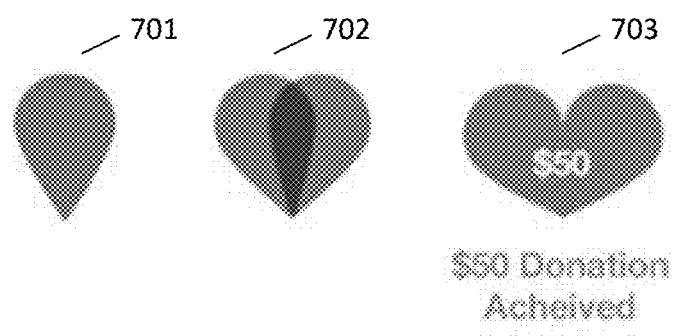
FIG. 7 illustrates different stages of an animation that may be used to indicate and/or notify a viewer that a milestone and/or goal has been achieved.

FIG. 7 illustrates different stages of an animation 700 that may be used to indicate and/or notify a viewer that a milestone and/or goal has been achieved. Animation 700 may start as a marker 701 on a trail of a map, such as marker 640 on GUI 600 of FIG. 6. The marker may indicate the location of a goal and/or milestone that a user is attempting to complete. When the user successfully completes the goal and/or milestone, the system may begin an animation to split into a heart as shown by a mid-animation marker 702. The marker may complete into heart marker 703, which is a shape created from two marker 701 shapes. Heart marker 703 may also display the incentive that was achieved and a message.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

What is claimed is:

1. An exercise incentive system, comprising:
   a non-transitory memory storing instructions; and
   one or more processors coupled to the non-transitory memory and configured to execute the instructions from the non-transitory memory to cause the system to perform operations comprising:
   providing, on a first user device associated with a first user, a first graphical user interface (GUI) for determining a fitness goal;
   determining, based on a first input on the first GUI by the first user, the fitness goal for the first user;
   determining a travel route based on the fitness goal;
   presenting, on the first GUI, a first map indicating the travel route determined for the first user;
   determining, based on a second input on the first GUI by the first user, one or more milestones along the travel route;
   providing, on a second user device associated with a second user, a second GUI presenting a second map indicating the travel route determined for the first user;
   presenting, on the second GUI, one or more graphical elements representing the one or more milestones on the second map;

determining, based on a third input on the second GUI by the second user, one or more incentives corresponding to the one or more milestones;

determining, based on first location data obtained from the first user device, a status of the first user with respect to a first milestone from the one or more milestones;

modifying a first graphical element from the one or more graphical elements corresponding to the first milestone provided in the second GUI displayed on the second device to indicate the determined status with respect to the first milestone;

configuring the second GUI to enable the second user to adjust an incentive corresponding to a second milestone based on the status with respect to the first milestone;

in response to receiving a fourth input on the second GUI, adjusting the incentive corresponding to the second milestone based on the fourth input; and in response to determining that the first user has completed the second milestone based on second location data obtained from the first user device, executing the adjusted incentive corresponding to the second milestone, wherein the executing comprises unlocking a third user device for an amount of time or adding usage time to the third user device.

2. The system of claim 1, wherein the fitness goal comprises a plurality of sub-goals and wherein the travel route is determined at least partially based on the sub-goals.

3. The system of claim 1, wherein the fitness goal comprises at least one of a swimming distance, a biking distance, or a running distance, and wherein determining the travel route comprises determining at least one of a swimming route, a biking route, or a running route.

4. The system of claim 1, wherein the operations further comprise:
executing a penalty when the fitness goal is not completed within a predetermined time.

5. The system of claim 1, wherein the operations further comprise providing a notification on the second GUI displayed on the second user device in response to determining that the first user has completed the one or more milestones.

6. The system of claim 1, wherein the operations further comprise providing, on the first GUI displayed on the first user device, the one or more graphical elements representing the one or more milestones on the first map.

7. The system of claim 1, wherein the operations further comprise providing, on the second map of the second GUI displayed on the second user device, an indication indicating a current location of the first user on the travel route.

8. The system of claim 1, wherein modifying the first graphical element comprises presenting an animation that transforms the first graphical element to the modified first graphical element.

9. The system of claim 1, wherein the executing further comprises providing the first user access to a functionality of the third user device.

10. A computer implemented method, the method comprising:
providing, by one or more hardware processors, a first graphical user interface (GUI) for determining a fitness goal on a first user device associated with a first user;

determining, by the one or more hardware processors based on a first input on the first GUI by the first user, the fitness goal for the first user;

determining, by the one or more hardware processors, a travel route based on the fitness goal;

presenting, by the one or more hardware processors on the first GUI, a first map indicating the travel route determined for the first user;

determining, by the one or more hardware processors based on a second input on the first GUI by the first user, one or more milestones along the travel route;

providing, by the one or more hardware processors, a second GUI on a second user device associated with a second user, the second GUI presenting a second map indicating the travel route determined for the first user and one or more graphical elements representing the one or more milestones on the second map;

determining, by the one or more hardware processors based on a third input on the second GUI by the second user, one or more incentives corresponding to the one or more milestones;

determining, by the one or more hardware processors based on first location data obtained from the first user device, that the first user has completed a first milestone from the one or more milestones;

modifying, by the one or more hardware processors, a first graphical element from the one or more graphical elements corresponding to the first milestone provided in the second GUI displayed on the second device to indicate a completion of the first milestone;

configuring, by the one or more hardware processors, the second GUI to enable the second user to adjust an incentive corresponding to a second milestone that has not been completed by the first user;

in response to receiving a fourth input on the second GUI, adjusting, by the one or more hardware processors, the incentive corresponding to the second milestone based on the fourth input; and in response to determining that the first user has completed the second milestone based on second location data obtained from the first user device, processing, by the one or more hardware processors, the adjusted incentive corresponding to the second milestone, wherein the processing comprises unlocking a third user device for an amount of time or adding usage time to the third user device.

11. The method of claim 10, wherein the first milestone is determined to be completed based on a distance traveled by the first user.

12. The method of claim 10, further comprising updating the second GUI displayed on the second user device to indicate a progress of the first user traveling on the travel route based on the first location data.

13. The method of claim 12, wherein the progress is shown on the second map of the second GUI by displaying a location icon indicating a current location of the first user.

14. The method of claim 10, further comprising executing a penalty in response to determining the fitness goal not being achieved within a predetermined amount of time.

15. The method of claim 10, further comprising providing, on the first GUI displayed on the first user device, the one or more graphical elements representing the one or more milestones on the first map.

16. The method of claim 10, wherein each of the one or more milestones represents a distance traveled along the travel route.

17. The method of claim 10, wherein the executing further comprises providing the first user access to a functionality of the third user device.

18. A non-transitory machine readable medium having stored thereon machine readable instructions executable to cause a machine to perform operations comprising:

providing, on a first user device associated with a first user, a first graphical user interface (GUI) for determining a fitness goal;

determining, based on a first input on the first GUI by the first user, the fitness goal for the first user;

determining a travel route based on the fitness goal;

presenting, on the first GUI, a first map indicating the travel route determined for the first user;

determining, based on a second input on the first GUI by the first user, one or more milestones along the travel route;

providing, on a second user device associated with a second user, a second GUI presenting a second map indicating the travel route determined for the first user;

presenting, on the second GUI, one or more graphical elements representing the one or more milestones on the second map;

determining, based on a third input on the second GUI by the second user, one or more incentives corresponding to the one or more milestones;

determining, based on first location data obtained from the first user device, a status of the first user with respect to a first milestone from the one or more milestones;

modifying a first graphical element from the one or more graphical elements corresponding to the first milestone provided in the second GUI displayed on the second device to indicate the determined status with respect to the first milestone;

configuring the second GUI to enable the second user to adjust an incentive corresponding to a second milestone based on the status with respect to the first milestone;

in response to receiving a fourth input on the second GUI, adjusting the incentive corresponding to the second milestone based on the fourth input; and in response to determining that the first user has completed the second milestone based on second location data obtained from the first user device, processing the adjusted incentive corresponding to the second milestone, wherein the processing comprises unlocking a third user device associated with the first user for an amount of time or adding usage time to the third user device.

19. The non-transitory machine readable medium of claim 18, wherein determining the status of the first user with respect to the first milestone comprises determining whether the first user has traveled a predetermined distance along the travel route within a predetermined amount of time.

20. The non-transitory machine readable medium of claim 18, wherein the operations further comprise providing, on the second map of the second GUI displayed on the second user device, an indication indicating a current location of the first user on the travel route.

* * * * *